June 5, 1928. 1,672,011
L. F. TRAPP
THRASHING MACHINERY
Filed Sept. 29, 1926   2 Sheets-Sheet 1
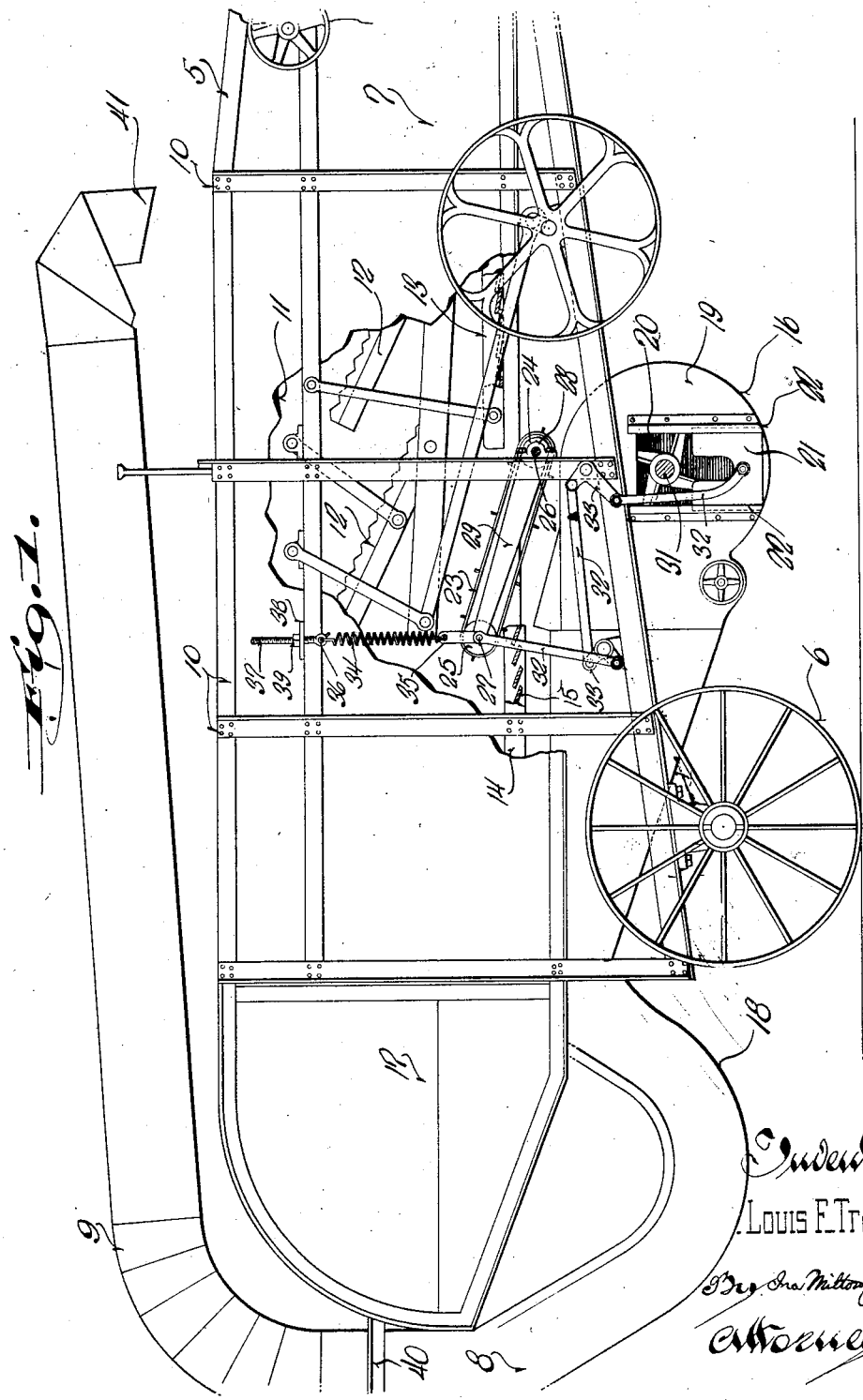

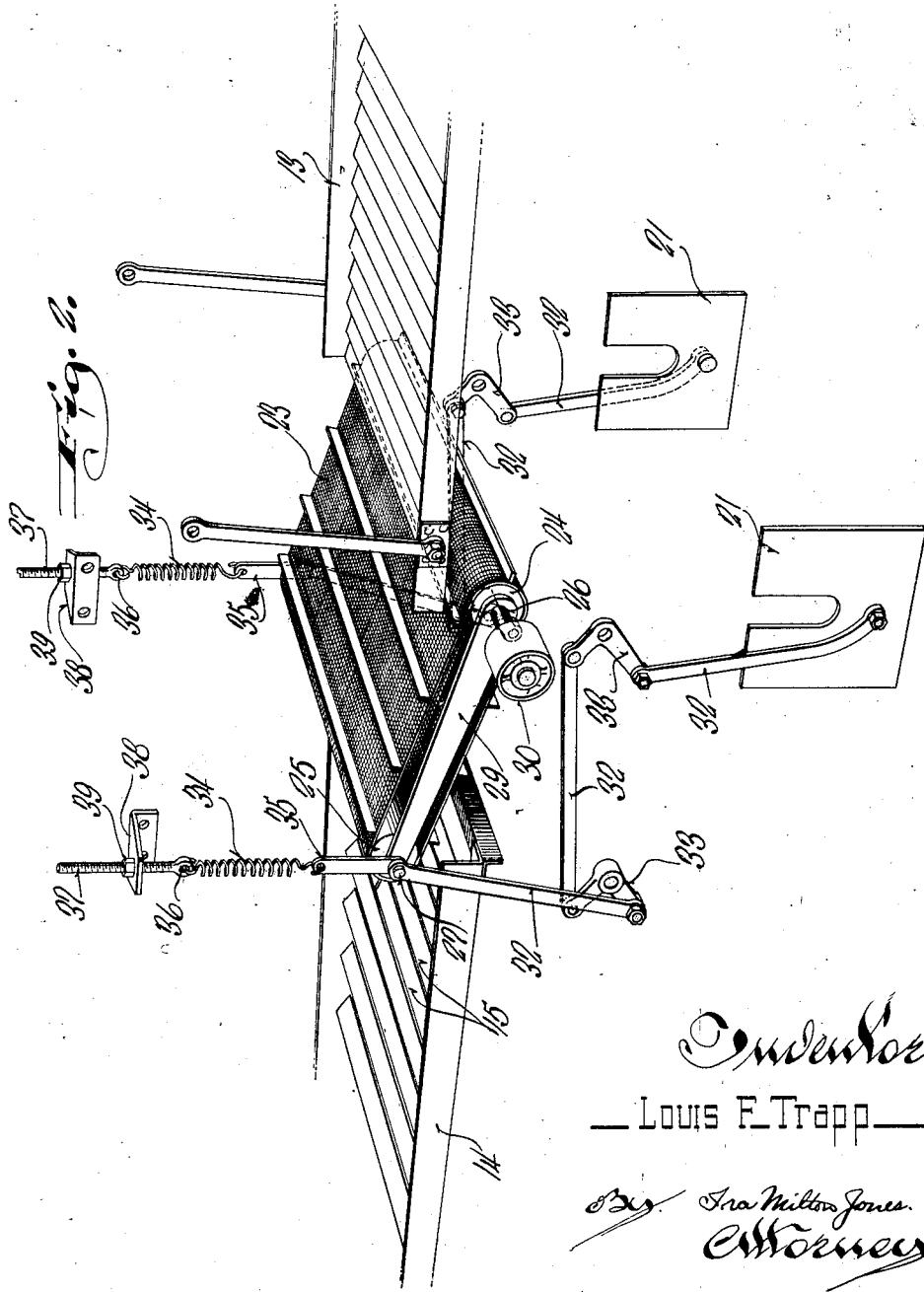

Patented June 5, 1928.

1,672,011

UNITED STATES PATENT OFFICE.

LOUIS F. TRAPP, OF COLUMBUS, WISCONSIN.

THRASHING MACHINERY.

Application filed September 29, 1926. Serial No. 138,418.

Heretofore the volume of the blast of air employed to separate and carry off chaff, dirt and other foreign matter from the thrashed grain has been adjusted manually, which has proven unsatisfactory in that changes in the volume of material being handled by the machine are not accommodated. As an example, when the volume of grain falls to a low point, the blast of air being the same as required for a large volume of grain, frequently carries part of the grain with it, the grain picked up by the blast being blown through the wind stacker and consequently lost.

Having the above and other objectionable features to grain thrashing machines in mind, this invention has as an object the provision of means for regulating the blast of air from the cleaning blower in direct relation to the volume or quantity of grain being passed through the machine.

A further object of this invention resides in the provision of an improved movable conveyer section arranged to receive the thrashed grain at a point prior to its discharge from the machine and having connections with a cleaning blower or fan whereby the blast delivered therefrom is in direct proportion to the grain being handled.

A further object of this invention resides in the provision of improved means connected with the blower or fan and located medially of the grain conveyer pan and the chaffer to regulate the blast delivered by the blower or fan in direct proportion to the volume of grain passing therethrough.

And a still further object of this invention resides in the provision of improved means of the character described which may be readily applied to thrashing machines now in use or to thrashing machines at the time of their manufacture.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a side view of a thrashing machine equipped with my improved appliance, parts thereof being broken away and in section to more clearly illustrate structural details and the mechanisms being in their positions assumed when a maximum volume of grain is passing over the movable conveyer section, and Figure 2 is a fragmentary perspective view illustrating my improved blower or fan blast regulating mechanism detached from the thrashing machine.

Referring now more particularly to the accompanying drawings, in which like numerals designate like parts throughout the several views, the numeral 5 designates a thrashing machine of any desired manufacture or construction and adapted to be supported from wheels or other means 6 and having a thrashing end 7 and a discharge end 8, from which a wind pipe stacker 9 leads to a suitable point of discharge. The machine proper includes a suitable framework of vertical, horizontal and transverse beams or sills 10 to which side, bottom and top walls 11 are secured to encase the machine mechanism. A plurality of shakers 12 are suitably mounted within the encasement to agitate the wheat sufficiently to separate the grain or kernels therefrom which drop upon a reciprocable pan or conveyer 13. The floor of the pan 13 is preferably stepped and, heretofore, has discharged onto a chaffer 14 between the baffles 15 of which the grain or kernels fall into a suitable collecting pan, the chaff, dirt, straw and other foreign matter being separated therefrom at the chaffer by a blast of air directed through the baffles 15 from a blower or fan 16. The foreign matter separated from the grain is then conveyed to a wind staker housing 17 from whence it is picked up by a conveying current of air created by a second blower located in a housing 18 and conveyed to the point of discharge through the stacker tube 9.

The housing 19 of the cleaning blower or fan 16 is provided with one or more inlet openings 20, the areas of which are subject to adjustment by gate valves 21 slidable thereover between guides 22. Heretofore it has been customary to adjust the valves 21 for the average running condition and as a result when the volume of grain delivered to the chaffer 14 by the shaker or conveying pan 13 fell below a predetermined point, the blast from the cleaning blower or fan 16 picked up a portion if the grain discharging it with the dirt, chaff and other foreign matter. Likewise when the volume of grain delivered to the chaffer 14 exceeded a predetermined amount, the blast proved insufficient to pass therethrough and separate the foreign matter therefrom. Therefore, I interpose means between the shaker pan or conveyer 13 and the chaffer 14 which is responsive to the volume or weight of the grain delivered to the chaffer to operate the valves 21 in direct proportion thereto.

To this end I terminate the shaker pan or conveyer 13 short of the chaffer 14 and interpose an endless conveyer 23 therebetween in the form of a belt trained about two rollers or other means 24 and 25 mounted on shafts 26 and 27. The roller 24 is under and inwardly of the discharge end of the pan or conveyer 13 and the roller 25 is above and extends over the receiving end of the chaffer 14 so that grain from the shaker pan or conveyer 13 discharges directly onto a conveying belt and is discharged thereby directly onto the chaffer 14. The shaft 26 is suitably journaled in bearings 28 fixed to the frame of the thrashing machine and the shaft 27 is secured in the outer ends of two side beams or arms 29, the inner ends of which are movable on the shaft 26, one end of which extends beyond one beam 29 and has a pulley 30 fixed thereto to receive a drive belt, not shown, driven from the shaft 31 of the cleaning blower fan 16, or any other drive shaft of the machine.

The free end of the movable frame formed by the beams 29 with which the shaft 27 is connected, is connected with the slide valves 21 through a series of links 32 and bell cranks 33 so that an upward movement of the discharge or free end of the conveyer 23 tends to close the valves over the openings 20, and vice versa. The free or discharge end of the conveyer 23 is normally urged upwardly by one or more contractile springs 34 connected therewith at one end by links or other means 35 and having their other ends secured, as at 36, to eye bolts 37 readily longitudinally adjustably secured in brackets or supports 38 fixed to the frame. Suitable lock nuts 39 serve to secure the bolts in adjusted position. Thus it will be apparent that the tension of the springs 34 may be readily set for various operating conditions.

As will be readily apparent, the wind stacker 9 is rotated at the stacker turntable 40 to direct its discharge end 41 toward a desired location and the chaff, dirt, straw and other foreign matter is ejected from the machine by the blast or conveying current of air created by the blower fans 16 and 18, my improved device maintaining the volume or blast delivered by the cleaning fan 16 in direct ratio to the volume of grain discharged onto the chaffer to insure maximum efficiency at all times.

In the drawings, the endless conveyer is illustrated in the position assumed when a maximum volume of grain is being handled and the discharged end thereof is depressed to the full extent with the fan openings 20 unrestricted. With this arrangement of parts, a maximum blast is delivered to the adjustable chaffer 14 to insure the blast passing between the grain to separate the dirt, chaff, and other foreign matter therefrom, but assuming the amount of grain delivered to the chaffer should fall below the maximum point, the outer free end of the endless conveyer will be elevated by the springs 34 due to the decrease in weight of the grain passing thereover. As a result, the valves 21 are moved over the openings 20 a proportionate amount to correspondingly decrease the blast delivered by the cleaning blower. This arrangement prevents a stronger blast or conveying current of air passing through the chaffer than is required to efficiently clean the grain delivered to the chaffer.

From the foregoing description taken in connection with the accompanying drawings, it will be readily apparent to those skilled in the art to which an invention of this character appertains that I have provided an improved and novel appliance for thrashing machines which will greatly increase the efficiency and practicability thereof.

What I claim as my invention is:

1. In a thrashing machine including a chaffer, means for delivering a blast of air thereto and a grain conveying pan, an endless conveyer interposed between the grain pan and chaffer and adapted to receive grain from the pan and deliver the same onto the chaffer, means permitting movement of said conveyer under the weight of grain passing thereover, and means operable by the movement of said conveyer to regulate the blast of air delivered to the chaffer.

2. In a thrashing machine, a chaffer, a blower arranged to deliver a blast of air to the chaffer to separate chaff and other foreign matter from grain discharged thereonto, means for discharging grain onto the chaffer and including a frame, means pivotally mounting said frame with one end free and extending over the chaffer, rollers rotatable in the ends of the frame and a conveyer trained about the rollers, means normally tending to elevate the discharge end of the frame and the conveyer carried thereby, and means operable by the depression of the discharge end of the conveyer to increase the blast delivered to the chaffer by the blower.

3. In a thrashing machine, a chaffer, a blower arranged to deliver a blast of air to the chaffer to separate chaff and other foreign matter from grain discharged thereonto, means for discharging grain onto the chaffer and including a frame, means pivotally mounting said frame with one end free and extended over the chaffer, rollers rotatable in the ends of the frame, a conveyer trained about the rollers, means normally tending to elevate the discharge end of the frame and the conveyer carried thereby, means operable by the depression of the discharge end of the conveyer to increase the blast delivered to the chaffer by the blower, and means for adjusting the elevating means.

4. In a thrashing machine including a chaffer and means for delivering a blast of air to the chaffer, a frame, means pivotally mountitng the frame at one end, the other end of the frame extending over the chaffer, an endless conveyer mounted in the frame whereby material placed thereon is conveyed to the chaffer where the blast of air separates foreign matter therefrom, means normally elevating the end of the frame and the endless conveyer adjacent the chaffer, and means operable by the depression of the elevated end of the frame and conveyer by the weight of material conveyed thereover to adjust the blast of air according to the volume of material conveyed to the chaffer.

In testimony whereof I affix my signature.

LOUIS F. TRAPP.